July 5, 1932.  E. G. N. SALENIUS  1,866,489
METHOD OF SEPARATING OR CHURNING
Filed May 4, 1929  2 Sheets-Sheet 2

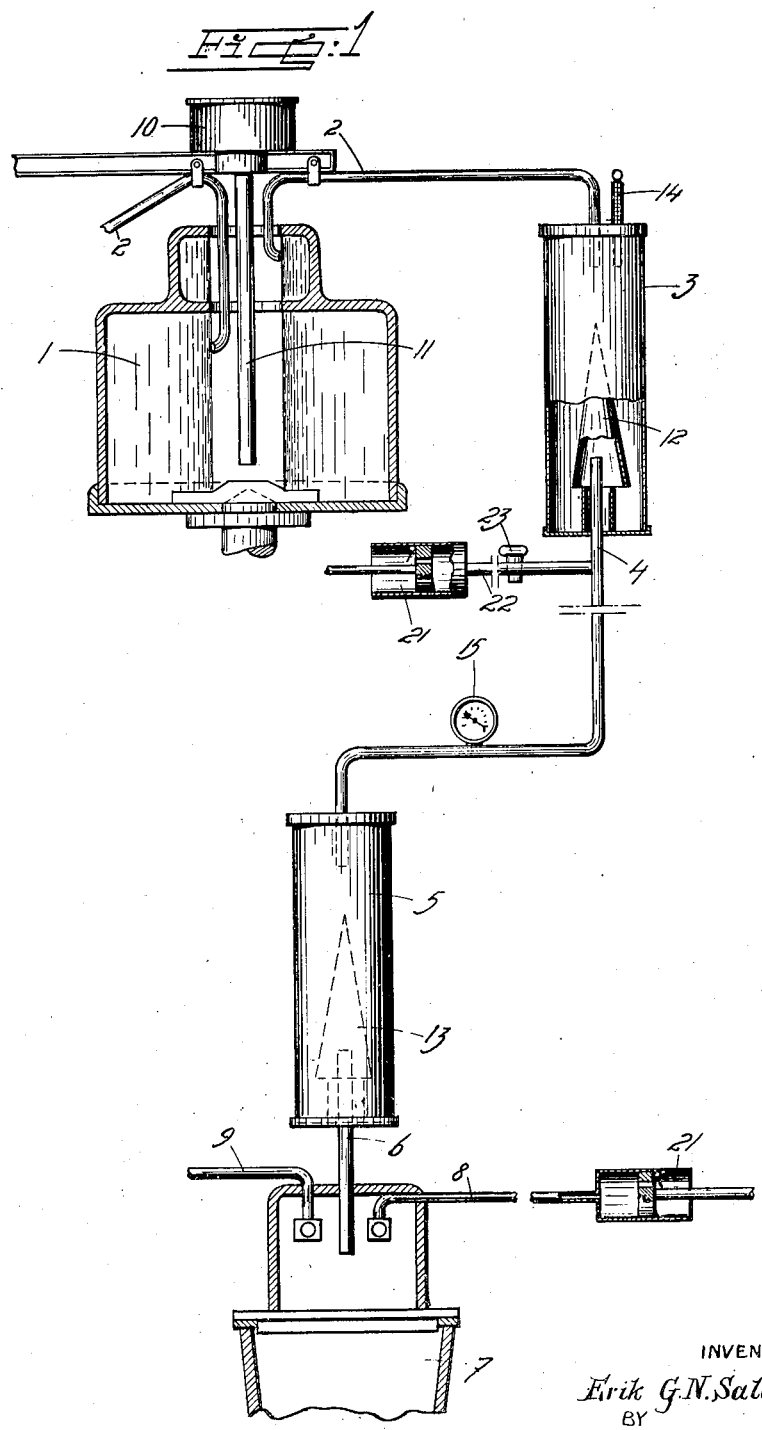

INVENTOR
Erik G. N. Salenius
BY
ATTORNEYS

Patented July 5, 1932

1,866,489

UNITED STATES PATENT OFFICE

ERIK GUSTAF NICOLAUS SALENIUS, OF STOCKHOLM, SWEDEN, ASSIGNOR TO ELISE SAMALIA SALENIUS, OF STOCKHOLM, SWEDEN

METHOD OF SEPARATING OR CHURNING

Application filed May 4, 1929, Serial No. 360,521, and in Sweden November 25, 1925.

In the treatment of whole milk or cream by means of centrifugal machines, to obtain either cream or butter directly from the milk, or butter from cream, the temperature of the milk or the cream is a very important matter. The temperature most suitable for the forming of the butter is substantially lower than that which is most advantageous for the separation of cream from the milk, and therefore the cream obtained at the separation should be immediately cooled to enable it to be directly changed into butter. If the cream is to be used as such, it is most advantageous for the durability of the same to cool it immediately after or preferably simultaneously with the separation.

This invention relates to a method, for the continuous separation or churning of butter directly by means of milk or cream from a centrifugal machine during the simultaneous cooling, or tempering, or maintenance of a temperature already obtained of the liquid, or a part separated from it, in order to make it durable, or even to make direct churning possible.

The method is here called external temperation and consists of the continuous separation or churning directly from whole milk or cream of the liquid during its passage from the centrifugal drum to a receptacle and is subjected during such separation to a vacuum of the same degree, or a different one, or a rarefied gas current in order that the liquid may be maintained at a desired temperature, be brought to evaporate, to gasify, to condensate or to be cooled down.

The method may be so carried out that during the passage of the cream (or the whole milk) from the centrifugal drum through a suction pipe, or tube system consisting of receptacles, tubes, tube bundles, or chambers, receptacles and tube systems which are subjected on the inside to a rarefaction of air of such a rarefaction degree, that the liquids existing in this sphere of the tube system are brought to boiling, or by subjecting the receptacles to cooling, and the cooling spheres of the tube system to a suitable, more efficacious rarefaction of air, which in addition to the vapours and heated air and water particles accompanying the liquids run into the centrifugal machine causes that the liquids existing in the cooling sphere to obtain the necessary cooling down or both the processes may be used at the same time or successively.

By being treated in such a way the liquid may for instance be brought to boiling (cold boiling) without having a boiled taste.

Figure 3:
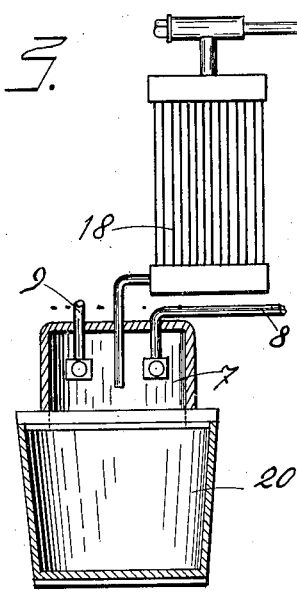
Figure 2:
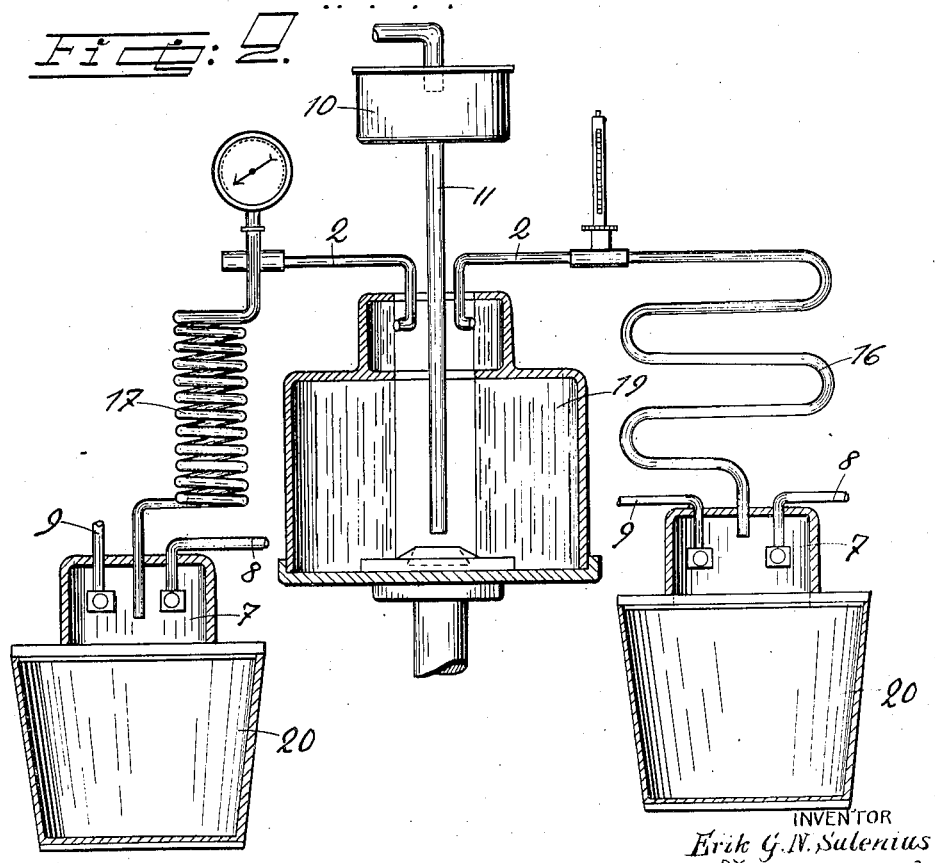

Devices suitable for the carrying out this method are illustrated by way of example in the accompanying drawings, in which Figs. 1–3 show three different modifications. Fig. 1 is an elevation, partially sectioned, of one embodiment, Fig. 2 a similar view of a second embodiment and of a third one, whereas Fig. 3 shows a part of a fourth embodiment.

The apparatus shown in Fig. 1 comprises a pipe 2, by means of which the cream is skimmed up from the centrifugal drum 1 and is sucked over to the receptacle 3 by means of vacuum, existing in said receptacle. The cream slowly falls to the bottom of the receptacle through vacuum and is conducted through the pipe 4 to the receptacle 5. The cream mass passes through the same procedure in receptacle 5 as that in the receptacle 3 and is sucked down through the pipe 6 into the receptacle 7, when the desired temperature during the passage has been successively reached. The vacuation takes place through one of the pipes 8 or 9, and, if necessary, by the coupling in of air pumps 21 with both pipes. The receptacles 3 and 5 and the pipes 2 and 4 may, if required, be made of different sizes and in a plurality, and they may be constructed in a great many ways.

The whole milk is run in through the receptacle 10 and is conducted to the bottom of the drum 1 by means of the pipe 11.

Cone-shaped hoods 12 and 13 serve to prevent the cream or the butter particles from getting directly into the pipes 4 and 6.

14 indicates a thermometer, and 15 a vacuum meter.

The skimming pipe 2 may be divided into two or several evacuation spheres. According to Fig. 1 a branch pipe 22 with a stop-tap 23 is for this purpose mounted in the pipe 4, which branch pipe leads to an air pump 21 or similar device. Thus a vacuum of another degree may exist in the pipe 2 and the receptacle 3 than in the pipe 4, the receptacle 5 and the receptacle 7.

The embodiments of the tube systems 16—17—18 shown in Figs. 2 and 3 are substantially adapted to be further cooled through air cooling or by means of water, the temperature of which is a little lower than the pasteurization temperature of the milk, i. e. water that may be easily provided in any climate.

The tube systems or coils may hereby be enclosed in a receptacle for cooling water (not shown), or even, as shown in the drawings, only lie in the open air.

20 indicates a special receptacle under the receptacle 7.

Having now described my invention, what I claim as new and desire to secure by Letters Patent is:

1. A method of continuously separating or churning directly a cream containing liquid which consists in passing the liquid from a centrifugal drum to a receptacle, and subjecting the liquid during its passage to different degrees of vacuum thereby maintaining the liquid at a desired temperature, causing it to evaporate, gasify, or be boiled or cooled down.

2. A method of continuously separating or churning directly a cream containing liquid which consists in passing the liquid from a centrifugal drum to a receptacle and subjecting the liquid during its passage to a rarefied gas current thereby producing different degrees of vacuum whereby the liquid may be maintained at a desired temperature evaporated, gasified, boiled or cooled down.

3. A method of separating a cream containing liquid which consists in passing the liquid from one receptacle to another and subjecting it during such passage to a vacuum of different degrees in different parts of the apparatus.

In witness whereof I have hereunto signed my name.

ERIK GUSTAF NICOLAUS SALENIUS.